US012437708B2

(12) United States Patent
Kim et al.

(10) Patent No.: US 12,437,708 B2
(45) Date of Patent: Oct. 7, 2025

(54) DISPLAY DEVICE

(71) Applicant: LG Display Co., Ltd., Seoul (KR)

(72) Inventors: Daehun Kim, Gumi-si (KR); JaeHyeon Woo, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/525,567

(22) Filed: Nov. 30, 2023

(65) Prior Publication Data

US 2024/0203324 A1 Jun. 20, 2024

(30) Foreign Application Priority Data

Dec. 14, 2022 (KR) ........................ 10-2022-0174880

(51) Int. Cl.
*G09G 3/32* (2016.01)

(52) U.S. Cl.
CPC ....... *G09G 3/32* (2013.01); *G09G 2310/0213* (2013.01); *G09G 2310/0237* (2013.01); *G09G 2310/08* (2013.01); *G09G 2330/028* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 8,102,356 B2 * | 1/2012 | Kim | G09G 3/3677 349/40 |
| 2021/0043149 A1 * | 2/2021 | Yoo | G09G 3/3291 |
| 2022/0093040 A1 | 3/2022 | Han et al. | |

FOREIGN PATENT DOCUMENTS

KR 10-2022-0040571 A 3/2022

* cited by examiner

*Primary Examiner* — Duane N Taylor, Jr.
(74) *Attorney, Agent, or Firm* — Morgan, Lewis & Bockius LLP

(57) ABSTRACT

According to an aspect of the present disclosure, the display device includes a display panel in which a pixel circuit including a light-emitting diode and a driving transistor connected to the light-emitting diode is disposed. Also, the display device includes a power circuit configured to generate a high-potential power voltage and supplies the high-potential power voltage to the pixel circuit. Further, the display device includes a sequence control circuit connected to the power circuit, configure to generate a power control signal for controlling whether or not to operate the power circuit and supplies the power control signal to the power circuit.

11 Claims, 7 Drawing Sheets

DISPLAY DEVICE

CROSS-REFERENCE TO RELATED APPLICATIONS

This application claims the priority of Korean Patent Application No. 10-2022-0174880 filed on Dec. 14, 2022, in the Korean Intellectual Property Office, the disclosure of which is incorporated herein by reference.

BACKGROUND

Technical Field

The present disclosure relates to a display device including a light-emitting diode.

Discussion of the Related Art

With the development of the information society, display devices for displaying images are being increasingly required in various forms. In recent years, various display devices, such as a liquid crystal display device (LCD), a plasma display panel (PDP), and an organic light-emitting display device (OLED), have been utilized.

A display device performs an operation using various signals or various powers. For example, the display device operates a display panel by supplying a power, such as a data voltage or a high-potential voltage, to the display panel.

The display device may be connected to an external system including various types of power supply sources, such as a battery and an adapter. The display device may be provided with power from the external system and may generate power for operating the display panel. The display device may control the display panel by using the generated power.

The various signals (or powers) used for the display device may change in value depending on the operation state of the display device. Each of the signals may have a different value, and the time taken to complete a change in signal value may be different for each power. Therefore, in some cases, the sequence of signal flow may be reversed, which may cause abnormal display.

SUMMARY

Accordingly, embodiments of the present disclosure are directed to a display device that substantially obviates one or more of the problems due to limitations and disadvantages of the related art.

An aspect of the present disclosure is to provide a display device which suppresses a reversal of a signal flow sequence by controlling a voltage.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel in which a pixel circuit including a light-emitting diode and a driving transistor connected to the light-emitting diode is disposed. Also, the display device includes a power circuit configured to generate a high-potential power voltage and supplies the high-potential power voltage to the pixel circuit. Further, the display device includes a sequence control circuit connected to the power circuit, configure to generate a power control signal for controlling whether or not to operate the power circuit and supplies the power control signal to the power circuit.

Other detailed matters of the exemplary embodiments are included in the detailed description and the drawings.

According to the present disclosure, it is possible to suppress a reversal of a signal flow sequence by controlling a high-potential input voltage.

Also, according to the present disclosure, it is possible to control turning-on and/or -off of a power circuit by using a sequence control signal generated based on the high-potential input voltage.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
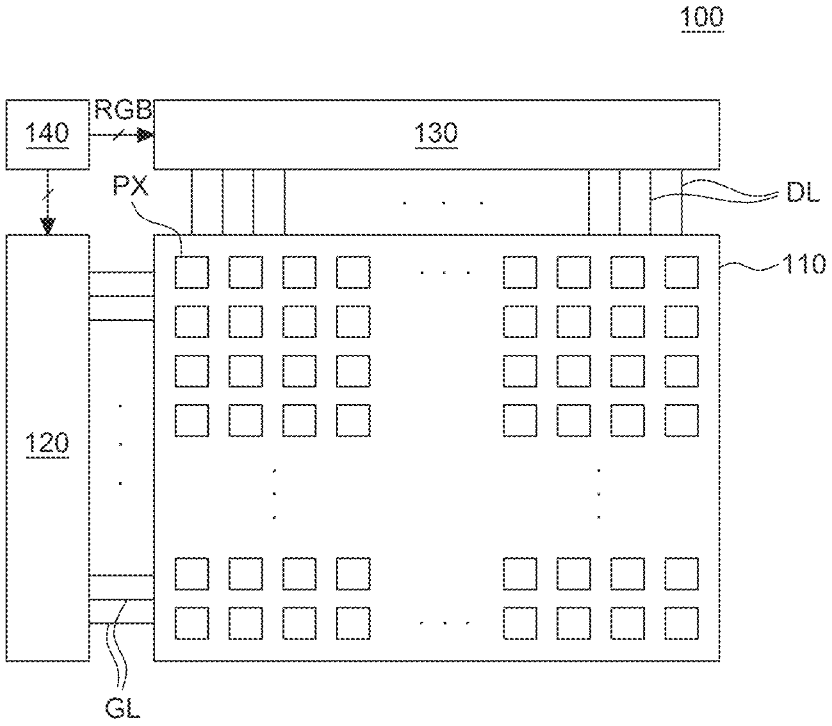
FIG. 1 is a block diagram for illustrating a display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a block diagram for illustrating a display device according to an embodiment of the present disclosure.

Referring to FIG. 1, a display device 100 includes a display panel 110, a gate driver 120, a data driver 130, and a power supply unit 140.

The display panel 110 includes a substrate made of glass or plastic, and a plurality of gate lines GL and a plurality of data lines DL disposed to intersect each other on the substrate. A plurality of pixels PX is defined at intersections between the plurality of gate lines GL and the plurality of data lines DL, respectively. Also, an area in which the plurality of pixels PX that displays an image is disposed may be referred to as a display area. Further, an area which is disposed outside the display area and in which the plurality of pixels PX is not disposed may be referred to as a non-display area.

Each of the plurality of pixels PX in the display panel 110 includes at least one transistor. The transistor may be implemented with at least one of an n-channel transistor (NMOS) and a p-channel transistor (PMOS). The transistor may be implemented with oxide an semiconductor transistor including an oxide semiconductor as an active layer or an LTPS transistor including temperature poly-silicon (LTPS) as an active layer. The transistor may include at least a gate electrode, a source electrode, and a drain electrode. The transistor may be implemented as a thin film transistor (TFT) on the display panel. In the transistor, a carrier moves from the source electrode to the drain electrode. In the NMOS, the carrier is an electron, and, thus, the source electrode has a lower voltage than the drain electrode for the electron to move from the source electrode to the drain electrode. In the NMOS, a current moves from the drain electrode to the source electrode, and the source electrode may be an output terminal. In the PMOS, the carrier is a hole, and, thus, the source electrode has a higher voltage than the drain electrode for the hole to move from the source electrode to the drain electrode. In the PMOS, the hole moves from the source electrode to the drain electrode, and, thus, a current moves from the source electrode to the drain electrode and the drain electrode may be an output terminal. Therefore, the source electrode and the drain electrode of the transistor may not be fixed, but may be switched in response to an applied voltage. In the present disclosure, even though the description will be made under the assumption that the transistor is the NMOS, the present disclosure is not limited thereto. The PMOS may also be used and the circuit configuration may be modified accordingly.

As for transistors used as switching elements, a gate signal swings between a turn-on voltage and a turn-off voltage. The turn-on voltage is set to a voltage higher than a threshold voltage Vth of a transistor, whereas the turn-off voltage is set to a voltage lower than the threshold voltage Vth of the transistor. The transistor is turned on in response to the turn-on voltage and is turned off in response to the turn-off voltage. As for the NMOS, the turn-on voltage may be a high voltage and the turn-off voltage may be a low voltage. As for the PMOS, the turn-on voltage may be a low voltage and the turn-off voltage may be a high voltage.

If the display device 100 according to an embodiment of the present disclosure is an electroluminescent display device, a current is applied to an electroluminescent diode provided in the plurality of pixels PX. Thus, discharged electrons and holes are coupled to generate excitons. Further, the excitons emit light to implement a gray scale of the display device 100.

The plurality of pixels PX may be sub-pixels that emit light of different colors. For example, each of the plurality of pixels PX may be a red sub-pixel, a green sub-pixel, a blue sub-pixel, or a white sub-pixel, but is not limited thereto. The plurality of pixels PX may form a unit pixel. That is, a red sub-pixel, a green sub-pixel, a blue sub-pixel, and a white sub-pixel may form a unit pixel, and the display panel 110 may include a plurality of unit pixels.

In some embodiments, the pixel PX shown in FIG. 1 may also refer to a unit pixel composed of a plurality of sub-pixels. A pixel circuit may be implemented for each sub-pixel. If the pixel PX includes a plurality of sub-pixels, the pixel PX includes pixel circuits corresponding to the plurality of sub-pixels, respectively.

Each pixel circuit may include a switching transistor, a driving transistor, a storage capacitor, and a light-emitting diode (LED). The LED may include an anode, an organic layer, and a cathode. The organic layer may further include various organic layers such as a hole injection layer, a hole transport layer, an organic emission layer, electron transport layer, and an electron injection layer. The anode of the LED may be connected to an output terminal of the driving transistor, and a low-potential power voltage VSSEL may be applied to the cathode. A low-potential voltage line may serve as a forward power line that applies a low-potential power voltage which is forward power. The low-potential voltage line may be referred to as a ground terminal.

The switching transistor serves to transfer a data voltage Vdata to a gate node corresponding to a gate electrode of the driving transistor. The switching transistor may include a drain electrode connected to the data line DL, a gate electrode connected to the gate line GL, and a source electrode connected to the gate electrode of the driving transistor. The switching transistor may be turned on by a scan signal applied from the gate line GL to transfer the data voltage Vdata provided from the data line DL to the gate node corresponding to a gate electrode of a driving transistor.

The driving transistor servers to drive an LED by supplying a driving current to the LED. The driving transistor may include the gate electrode corresponding to the gate node and a source electrode corresponding to a second node and serving as an output terminal. Also, the driving transistor may include a drain electrode corresponding to a third node and serving as an input terminal. The gate electrode of the driving transistor may be connected to the switching transistor and the drain electrode may receive a high-potential power voltage VDDEL through a high-potential voltage line. Also, the source electrode may be connected to the anode of the LED.

The storage capacitor serves to hold a voltage equal to the data voltage Vdata for one frame. One electrode of the storage capacitor may be connected to the gate node, and the other electrode of the storage capacitor may be connected to the second node.

However, the display device 100 according to an embodiment of the present disclosure is not limited to the electroluminescent display device, and may be one of various display devices such as a liquid crystal display device.

The gate driver 120 sequentially supplies gate voltages which are on-voltages or off-voltages to the gate lines GL in response to gate control signals output from a timing controller.

The gate control signals include a gate start pulse, a gate shift clock, and a gate output enable signal.

The gate start pulse controls an operation start timing of one or more gate circuits constituting the gate driver 120. The gate shift clock is a clock signal which is commonly input to one or more gate circuits and controls a shift timing of the scan signal (gate pulse). The gate output enable signal designates timing information of one or more gate circuits.

According to a driving method, the gate driver 120 may be disposed on only one side of the display panel 110 or disposed on both sides if necessary.

The gate driver 120 may include a shift register or a level shifter. The shift register may be composed of a plurality of stages that shifts and outputs gate signals in response to clock signals and driving signals. The plurality of stages included in the shift register may sequentially output the gate signals through a plurality of output terminals.

The data driver 130 converts image data received from the timing controller into an analog data voltage Vdata to output the analog data voltage Vdata to the data lines DL based on data control signals.

The data control signals include a source start pulse, a source sampling clock, and a source output enable signal.

The source start pulse controls a data sampling start timing of one or more data circuits constituting the data driver 130. The source sampling clock is a clock signal which controls a sampling timing of data in each data circuit. The source output enable signal controls an output timing of the data driver 130.

The data driver 130 may be connected to a bonding pad of the display panel 110 by means of a tape automated bonding method or a chip on glass method. The data driver 130 may be directly disposed in the display panel 110, or may be integrated to be disposed in the display panel 110 if necessary.

The data driver 130 may include a logic unit including various circuits such as a level shifter or a latch unit, a digital analog converter (DAC), and an output buffer.

The power supply unit 140 may convert an input voltage provided from an external system into a driving voltage required for driving the display device 100. The power supply unit 140 may include a main power circuit to be described with reference to FIG. 2. In this case, the power supply unit 140 may convert the input voltage. Then, the power supply unit 140 may generate and output a gate high-potential voltage VGH, a gate low-potential voltage VGL, a reference voltage Vref, an initial voltage (or stabilization voltage) Vini, and a source high-potential voltage SVDD. The gate high-potential voltage VGH and the gate low-potential voltage VGL are used to generate a gate voltage, and may be provided to the gate driver 120. The reference voltage Vref is provided to the pixel PX (or pixel circuit) of the display panel, and may include a reference voltage for driving the pixel circuit. The reference voltage Vref has a predetermined value based on electrical characteristics of the display panel 110. The initial voltage (or stabilization voltage) Vini may include a voltage for stabilizing driving of the driving transistor. The source high-potential voltage SVDD is a high-potential power voltage to be applied to a gamma voltage divider circuit of the data driver 130 configured to generate gamma reference voltages, and may be provided to the data driver 130.

In an embodiment, the power supply unit 140 may include a power circuit to be described with reference to FIG. 2. The power circuit may generate the high-potential power voltage VDDEL and supply the high-potential power voltage VDDEL to an electroluminescent diode (or LED) included in each of the plurality of pixels PX (or pixel circuit).

Figure 2:
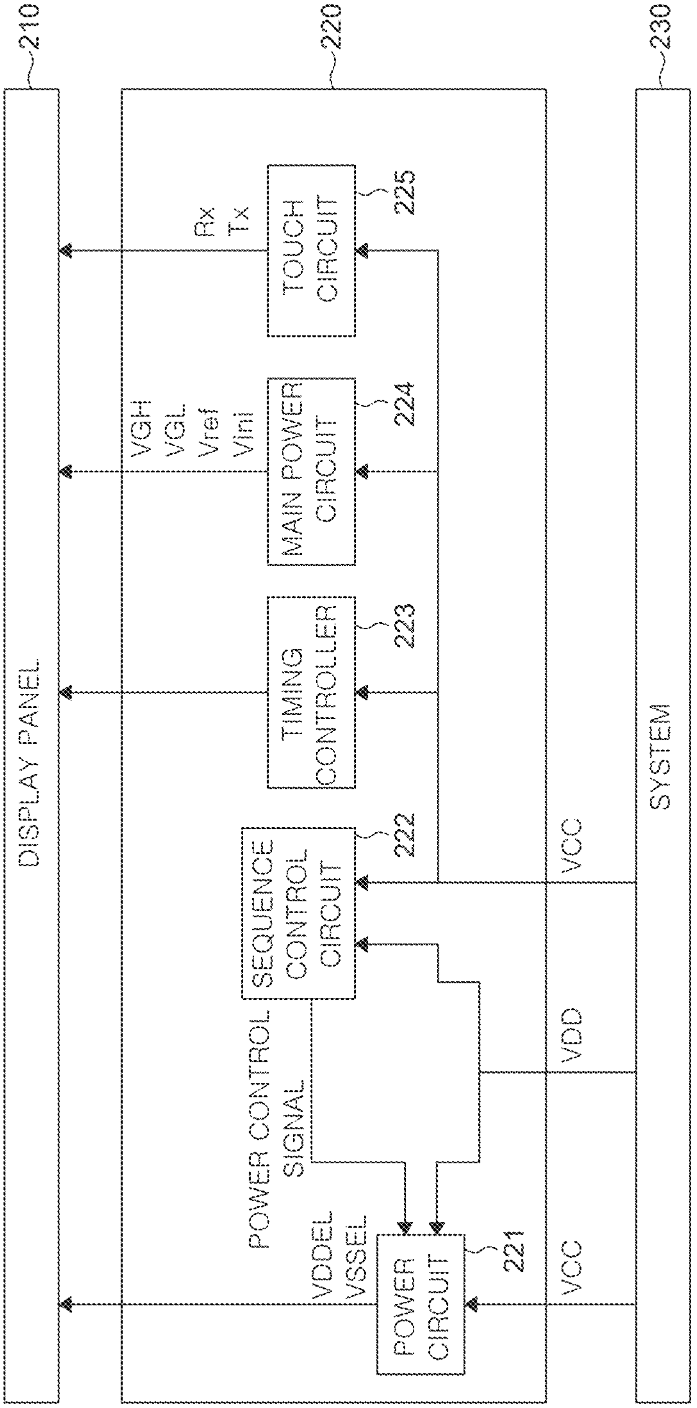
FIG. 2 is a block diagram showing examples of components included in a display device according to an embodiment of the present disclosure.

FIG. 2 is a block diagram showing examples of components included in a display device according to an embodiment of the present disclosure.

Referring to FIG. 2, the display device may include a display panel 210, a controller 220, and a system 230. The display panel may correspond to the display panel 110 shown in FIG. 1. The controller 220 may be separated from the display panel 210 and disposed inside a display device 200.

In an embodiment, the display device may include a display area and a non-display area. At least a part of the display panel 210 may be disposed in the display area. At least another part of the display panel 210 and the controller 220 may be disposed in the non-display area.

In an embodiment, the controller 220 may include a printed circuit board (PCB) and various circuits, such as a power circuit 221, a sequence control circuit 222, a timing controller 223, a main power circuit 224, and a touch circuit 225.

In an embodiment, the controller 220 may be implemented such that various circuits are disposed on the PCB. For example, the power circuit 221, the sequence control circuit 222, the timing controller 223, the main power circuit 224, and the touch circuit 225 may be disposed on the PCB. Each of the circuits may perform a different function from each other. Each of the circuits will be described below.

In some embodiments, the controller 220 may include a plurality of PCBs, for example, a first PCB and a second PCB. In this case, at least some of the power circuit 221, the sequence control circuit 222, the timing controller 223, the main power circuit 224, and the touch circuit 225 may be disposed on the first PCB. At least others of the power circuit 221, the sequence control circuit 222, the timing controller 223, the main power circuit 224, and the touch circuit 225 may be disposed on the second PCB. For example, the power circuit 221, the sequence control circuit 222, the timing controller 223, and the main power circuit 224 may be disposed on the first PCB. The touch circuit 225 may be disposed on the second PCB.

In an embodiment, the display device may be connected to the system 230. The system 230 may include an external device connected to the display device. For example, the system 230 may include a battery and/or a battery control device connected to the display device. The display device may be connected to the system 230 and thus may be provided with power therefrom. The display device may use the provided power to drive components of the display device. For example, the display device may be provided with a high-potential basic voltage VDD and an operating voltage VCC from the system 230. The controller 220 of the display device may use the high-potential basic voltage VDD and the operating voltage VCC to drive circuits included in the controller 220 or generate a signal (or voltage) to be provided to the display panel 210.

In an embodiment, the high-potential basic voltage VDD may be involved in generating a high-potential power voltage to be provided to the pixel circuit of the display panel 210. For example, the high-potential basic voltage VDD may be generated for a process before the high-potential power voltage VDDEL is generated. As will be described below, the high-potential basic voltage VDD may be converted into the high-potential power voltage VDDEL by the power circuit 221. The operating voltage VCC may include a voltage as a power source for operating the circuits included in the controller 220. The circuits included in the controller 220 need a predetermined amount of power, e.g., voltage, for driving. The operating voltage VCC may serve as a power source for supplying the power. The high-potential basic voltage VDD and the operating voltage VCC may have predetermined voltage values. The high-potential basic voltage VDD may have a greater value than the operating voltage VCC. For example, the high-potential basic voltage VDD may be 21 V, and the operating voltage VCC may be 3.3 V.

In some embodiments, the display device may include the display panel 210, the controller 220, and the system 230. In other words, the present disclosure is not limited by whether or not the system 230 is included in the display device. For example, the display device including the system 230 is different only in inclusion of the system 230 from the display device connected to the external system 230, but may operate in the same manner as described above.

In an embodiment, the power circuit 221 may generate a voltage involved in driving of the pixel circuit (or pixel PX of FIG. 1) included in the display panel 210. The power circuit 221 may generate the high-potential power voltage VDDEL and the low-potential power voltage VSSEL for driving the pixel circuit and supply them to the pixel circuit.

In an embodiment, the power circuit 221 may generate the high-potential power voltage VDDEL based on the high-potential basic voltage VDD provided from the system 230. For example, the power circuit 221 may be provided with the high-potential basic voltage VDD from the system 230. The power circuit 221 may convert the high-potential basic voltage VDD into the high-potential power voltage VDDEL.

In an embodiment, the power circuit 221 is configured to control driving of the power circuit 221, and may include at least one of an enable pin (or EN pin) and an under voltage lock out (UVLO) pin. A power control signal generated by the sequence control circuit 222 may be input into the EN pin or the UVLO pin. Accordingly, the power circuit 221 may be controlled by the power control signal.

Herein, the EN pin serves to control turning-on and/or -off of the power circuit 221. A voltage value of a signal input into the EN pin may be distinguished by a first value and a second value. For example, if the value of the signal input into the EN pin is equal to or greater than the first value, the power circuit 221 may be turned on. If the value of the signal input into the EN pin is equal to smaller than the second value (smaller than the first value), the power circuit 221 may be turned off. The signal (or power control signal) input into the EN pin ma be referred to as “EN signal”, but the present disclosure is not limited by the terms.

A UVLO refers to a threshold voltage at which the power circuit 221 is turned on (or off). The UVLO pin is a pin into which a voltage corresponding to the UVLO is input. For example, if a voltage smaller than the threshold voltage is input into the UVLO pin, the power circuit 221 may be turned off. If a voltage equal to or greater than the threshold voltage is input into the UVLO pin, the power circuit 221 may be turned on. A signal (or power control signal) input into the UVLO pin may be referred to as “UVLO signal” or “UVLO”, but the present disclosure is not limited by the terms.

In an embodiment, the power circuit 221 may be provided with the operating voltage VCC from the system 230. The operating voltage VCC may serve as a power source required for operating the power circuit 221. The EN signal and/or UVLO as well as the operating voltage VCC may be needed to complete the operation of the power circuit 221. For example, the EN signal and/or UVLO equal to or greater than the first value may be input into the power circuit 221 while the operating voltage VCC is being input. In this case, the power circuit 221 may generate the high-potential power voltage VDDEL and/or the low-potential power voltage VSSEL and supply the generated voltage to the display panel 210. When the EN signal and the UVLO are input, first values corresponding to the respective signals may be different from each other. For example, the EN signal may have a value greater than a first-first value, and the UVLO may have a value greater than a first-second value. However, the present disclosure is not limited thereto.

In some embodiments, the power circuit 221 may not be provided with the operating voltage VCC. In this case, the power circuit 221 may be provided with power required for operation from another power source. Herein, the other power source may include s such as the EN signal and/or UVLO.

In an embodiment, the sequence control circuit 222 may be connected to the power circuit 221. For example, the sequence control circuit 222 may be electrically connected to the power circuit 221. The sequence control circuit 222 may generate a power control signal for controlling whether or not to operate the power circuit 221. The sequence control circuit 222 may generate a power control signal for controlling turning-on or -off of the power circuit 221. The sequence control circuit 222 may supply the power control signal to the power circuit 221. The power control signal may include, for example, a signal for controlling turning-on and/or -off of the EN pin of the power circuit 221. For another example, the power control signal may include the UVLO.

In an embodiment, the sequence control circuit 222 may be provided with the high-potential basic voltage VDD from the system 230. The sequence control circuit 222 may use the high-potential basic voltage VDD and/or the operating voltage VCC to generate the power control signal.

For example, the sequence control circuit 222 may adjust a value of the high-potential basic voltage VDD to a value corresponding to the closest natural number equal to or greater than the operating voltage VCC. The sequence control circuit 222 may use a field effect transistor (FET) and/or a low dropout (LDO) to convert the adjusted high-potential basic voltage into the power control signal. For example, the sequence control circuit 222 may input the adjusted high-potential basic voltage into the FET and/or LDO to output the power control signal. A specific example of the FET can be seen from FIG. 3. A specific example of the LDO can be seen from FIG. 4.

For another example, the sequence control circuit 222 may use a voltage detector to convert the high-potential basic voltage VDD into the power control signal. For example, the sequence control circuit 222 may input the high-potential basic voltage VDD into the voltage detector to output the power control signal. A specific example of the voltage detector can be seen from FIG. 5.

In an embodiment, the sequence control circuit 222 may use the adjusted high-potential basic voltage to generate the power control signal. The power control signal has a higher voltage value than the first value in a first state and a lower voltage value than the second value in a second state. The sequence control circuit 222 may obtain information regarding the first state or the second state from the display panel or other devices and generate the power control signal based on the information.

Herein, the first state may include a state in which the power circuit 221 is turned on or a state which enables the power circuit 221 to operate. Also, the second state may include a state in which the power circuit 221 is turned off or a state which disallows the power circuit 221 to operate. In some cases, the first state may include a state in which the display device is turned on, and the second state may include a state in which the display device is turned off.

For example, the power control signal may have a higher voltage value than the first value in the first state in which the power circuit 221 is turned on. The power control signal may have a lower voltage value than the second value in the second state in which the power circuit 221 is turned off. The first value and the second value may be previously determined. For example, the first value may be greater than the second value. For another example, the first value may be equal to the second value.

For example, if the power control signal includes the EN signal to be input into the EN pin, the first value may be greater than the second value. In the first state to turn on the power circuit 221, the sequence control circuit 222 may generate the EN signal having a higher voltage value than the first value and supply the EN signal to the power circuit 221. In the second state to turn off the power circuit 221, the sequence control circuit 222 may generate the EN signal having a lower voltage value than the second value and supply the EN signal to the power circuit 221.

For another example, if the power control signal includes the UVLO, the first value may be equal to the second value. In the first state to turn on the power circuit 221, the sequence control circuit 222 may generate the UVLO having a higher voltage value than the first value and supply the UVLO to the power circuit 221. In the second state to turn off the power circuit 221, the sequence control circuit 222 may generate the UVLO having a lower voltage value than the second value and supply the UVLO to the power circuit 221. Herein, the first value may be equal to the second value. The first value and the second value may be a threshold value of the UVLO for the power circuit 221. Therefore, if the UVLO having a value smaller than the threshold value is input into the power circuit 221, the power circuit 221 may not operate. If the UVLO having a value equal to or greater than the threshold value is input into the power circuit 221, the power circuit 221 may operate.

In an embodiment, the timing controller 223 may control synchronization or timing of various signals related to the display device. For example, the timing controller 223 may control timing of inputting signals generated from various components of the controller 220 into the display panel 210 to facilitate driving of the display panel 210. For another controller 223 may generate a example, the timing synchronization signal and supply the synchronization signal to the display panel 210 to control timing of various signals to be input into the display panel 210. For yet another example, the timing controller 223 may supply data related to driving of the LED included in the display panel 210 to the display panel 210. The operation of the timing controller 223 is not limited to the above-described examples, but the timing controller 223 may perform various operations that can be understood by a person having ordinary skill in the art.

In an embodiment, the main power circuit 224 may generate various power signals related to driving of the display panel 210 and supply the power signals to the display panel 210. For example, the main power circuit 224 may generate the gate driving signals VGH and VGL for driving a gate driving circuit. The main power circuit 224 may supply the gate driving signals VGH and VGL to the gate driving circuit. The gate driving circuit may use the gate driving signals VGH and VGL to generate a gate signal. The gate driving signals VGH and VGL may include the gate high-potential voltage VGH and the gate low-potential voltage VGL. For another example, the main power circuit 224 may generate the reference voltage Vref and/or the initial voltage Vini required for driving the pixel circuit and supply the generated voltage to the display panel 210.

In an embodiment, the touch circuit 225 may sense a touch through the touch circuit disposed in the display panel 210. The touch circuit 225 may generate touch signals Rx and Tx for touch sensing and supply the touch signals Rx and Tx to the display panel 210. When a touch is input into the display panel 210, the touch circuit 225 may sense the touch based on the touch signals Rx and Tx.

In an embodiment, the timing controller 223, the main power circuit 224, and/or the touch circuit 225 may be provided with the operating voltage VCC from the system 230. The timing controller 223, the main power circuit 224, and/or the touch circuit 225 may be driven based on the operating voltage VCC. In this case, the operating voltage VCC may be used as a power source for driving the timing controller 223, the main power circuit 224, and/or the touch circuit 225. However, the present disclosure is not limited thereto. At least some of the timing controller 223, the main power circuit 224, and/or the touch circuit 225 may use the operating voltage VCC to at least some of signals to be provided to the display panel 210.

Figure 3:
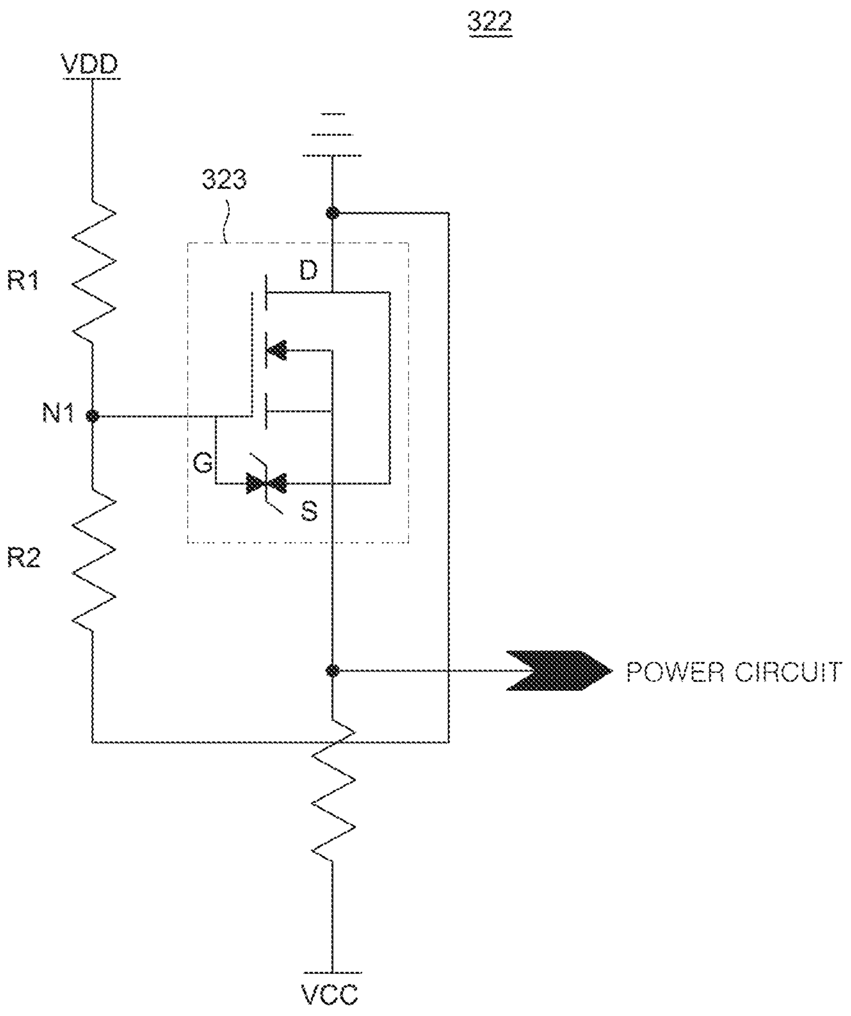
FIG. 3 shows an example of a sequence control circuit of the display device according to an embodiment of the present disclosure.

FIG. 3 shows an example of a sequence control circuit of the display device according to an embodiment of the present disclosure. FIG. 3 shows an example of a sequence control circuit 322 including an FET.

Referring to FIG. 3, the sequence control circuit 322 may use a plurality of resistances R1 and R2 to convert the high-potential basic voltage VDD. For example, the sequence control circuit 322 may use the plurality of resistances R1 and R2 to adjust the high-potential basic voltage VDD so as to correspond to the closest natural number equal to or greater than the operating voltage VCC in a first node N1. For example, if the high-potential basic voltage VDD is 16 V and the operating voltage VCC is 3.3 V, the sequence control circuit 322 may adjust the high-potential basic voltage VDD to 4 V so as to correspond to a natural number closest to 3.3 V.

In this case, the plurality of resistances R1 and R2 may have predetermined values depending on the values of the operating voltage VCC and the high-potential basic voltage VDD.

In an embodiment, the sequence control circuit 322 may input the adjusted high-potential basic voltage VDD into an FET 323. The sequence control circuit 322 may use the FET 323 to generate the power control signal, and may supply the power control signal to the power circuit.

FIG. 3 illustrates an example where the operating voltage VCC is input into the sequence control circuit 322, but the present disclosure is not limited thereto. The operating voltage VCC may be input in a path in which a signal moves from the sequence control circuit 322 to the power circuit. In this case, the operating voltage VCC may be disposed to be separate from the sequence control circuit 322.

In an embodiment, the FET 323 may include a field effect transistor. The FET 323 is configured to control the current of a source S and a drain D by applying a voltage to a gate electrode G to generate a gate through which electrons or holes flow due to an electric field of a channel.

Figure 4:
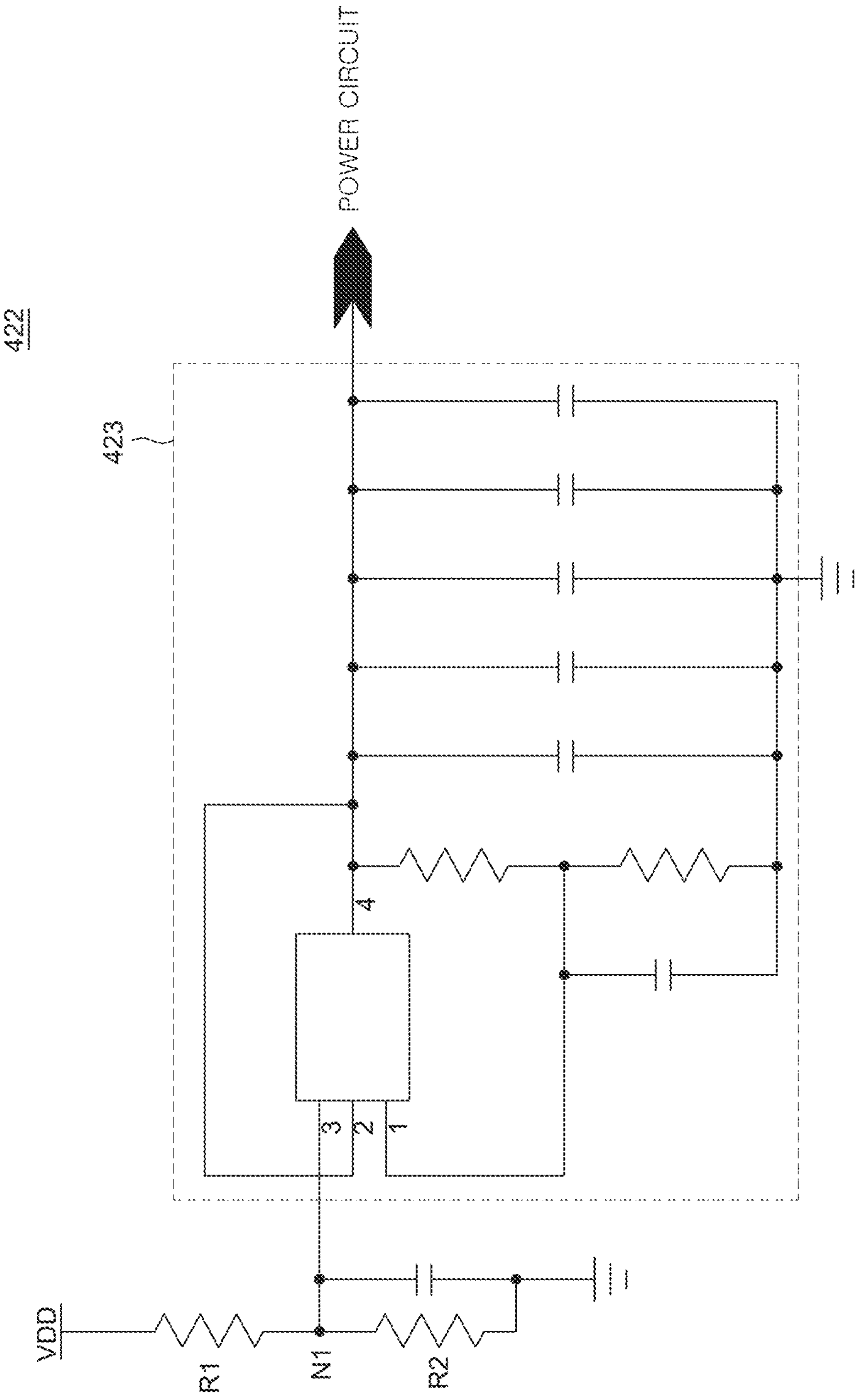
FIG. 4 shows another example of a sequence control circuit of the display device according to an embodiment of the present disclosure.

FIG. 4 shows another example of a sequence control circuit of the display device according to an embodiment of the present disclosure. FIG. 4 shows an example of a sequence control circuit 422 including an LDO.

Referring to FIG. 4, the sequence control circuit 422 may use the plurality of resistances R1 and R2 to convert the high-potential basic voltage VDD, which has been described above with reference to FIG. 3. Thus, a detailed description thereof will be omitted.

In an embodiment, the sequence control circuit 422 may input the adjusted high-potential basic voltage VDD into an LDO 423. The sequence control circuit 422 may use the LDO 423 to generate the power control signal, and may supply the power control signal to the power circuit.

In an embodiment, the LDO 423 may include a linear regulator that operates even with a low input/output potential difference. In some cases, the LDO 423 may be referred to as a low damage-type linear regulator or a low saturation-type linear regulator, but is not limited thereto. Since the LDO 423 can operate even at a low power voltage, low energy loss and high efficiency driving can be achieved. Therefore, it is possible to reduce the size of a pass transistor required to achieve a target current capacity.

According to an embodiment, at least one of a resistance and a capacitor included in the LDO 423 shown in FIG. 4 may be implemented to be separate from the LDO 423. For example, the LDO 423 may include a part indicated by a rectangle including nodes 1 to 4 shown in FIG. 4, and the resistance and the capacitor may be implemented as components disposed outside the LDO 423. However, this is merely an example, and the present disclosure is not limited thereto.

Figure 5:
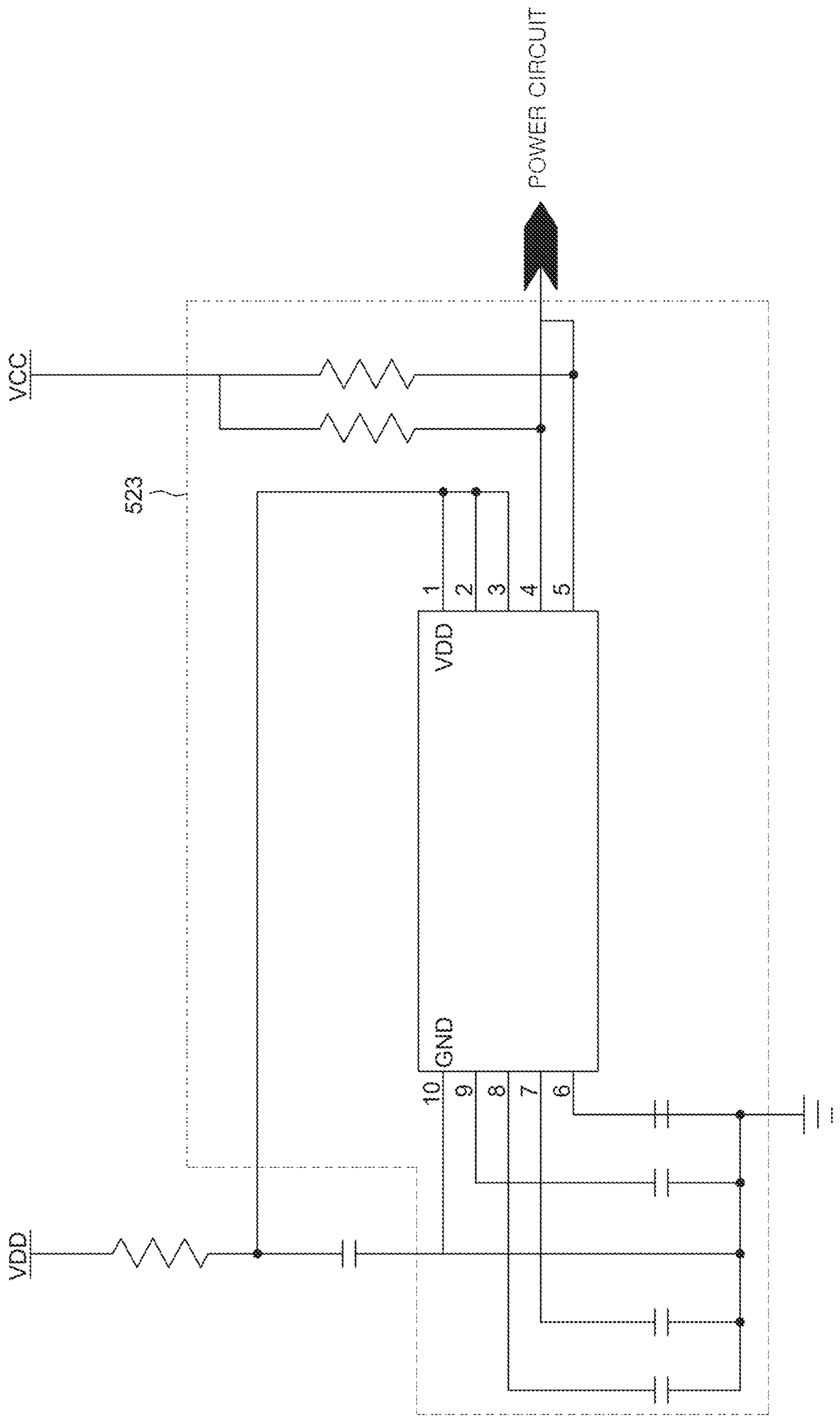
FIG. 5 shows yet another example of a sequence control circuit of the display device according to an embodiment of the present disclosure.

FIG. 5 shows yet another example of a sequence control circuit of the display device according to an embodiment of the present disclosure. FIG. 5 shows an example of a sequence control circuit 522 including a voltage detector.

Referring to FIG. 5, the sequence control circuit 522 may include a voltage detector 523. The sequence control circuit 522 may input the high-potential basic voltage VDD into the voltage detector 523. The sequence control circuit 322 may use the voltage detector 523 to generate the power control signal, and may supply the power control signal to the power circuit.

In an embodiment, the voltage detector 523 may monitor a provided voltage. If the provided voltage has a low value, the voltage detector 523 may turn off a device, e.g., the power circuit, connected to the voltage detector 523. For example, the voltage detector 523 may generate the power control signal that can turn off the power circuit when the provided voltage has a low value, and may supply the power control signal to the power circuit.

In an embodiment, at least one of the FET 323, the LDO 423, and the voltage detector 523 may include a well-known circuit that performs the same function. However, the present disclosure is not limited thereto.

In an embodiment, the high-potential basic voltage VDD may be connected to the resistance and the capacitor, and both ends of the capacitor may be connected to the voltage detector 523. For example, one side of the capacitor may be connected to a node 10 of the voltage detector 523 and the other side may be connected to a node 1 of the voltage detector 523. The node 10 may be connected to a line into which a ground (GND) voltage is input, and the node 1 may be connected to a line into which the high-potential basic voltage VDD is input.

According to an embodiment, at least one of a resistance and a capacitor included in the voltage detector 523 shown in FIG. 5 may be implemented to be separate from the voltage detector 523. For example, the voltage detector 523 may include a part indicated by a rectangle including nodes 1 to 10 shown in FIG. 5, and the resistance and the capacitor may be implemented as components disposed outside the voltage detector 523. However, this is merely an example, and the detector present disclosure is not limited thereto.

Figure 6A:
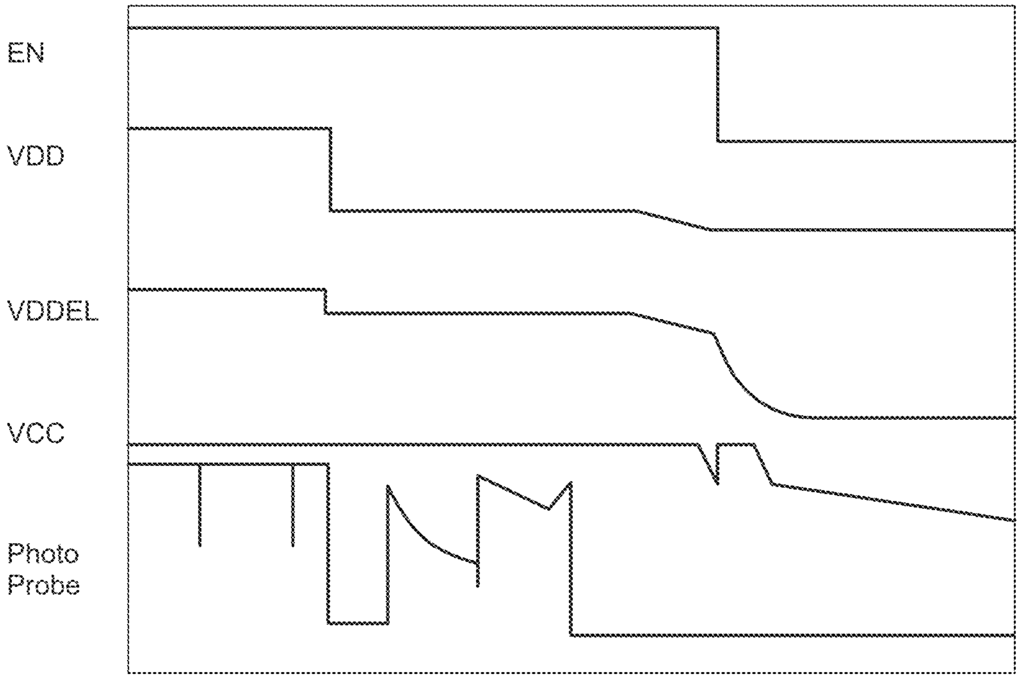
FIG. 6A and FIG. 6B show signal flowcharts for the display device according to an embodiment of the present disclosure.
Figure 6B:
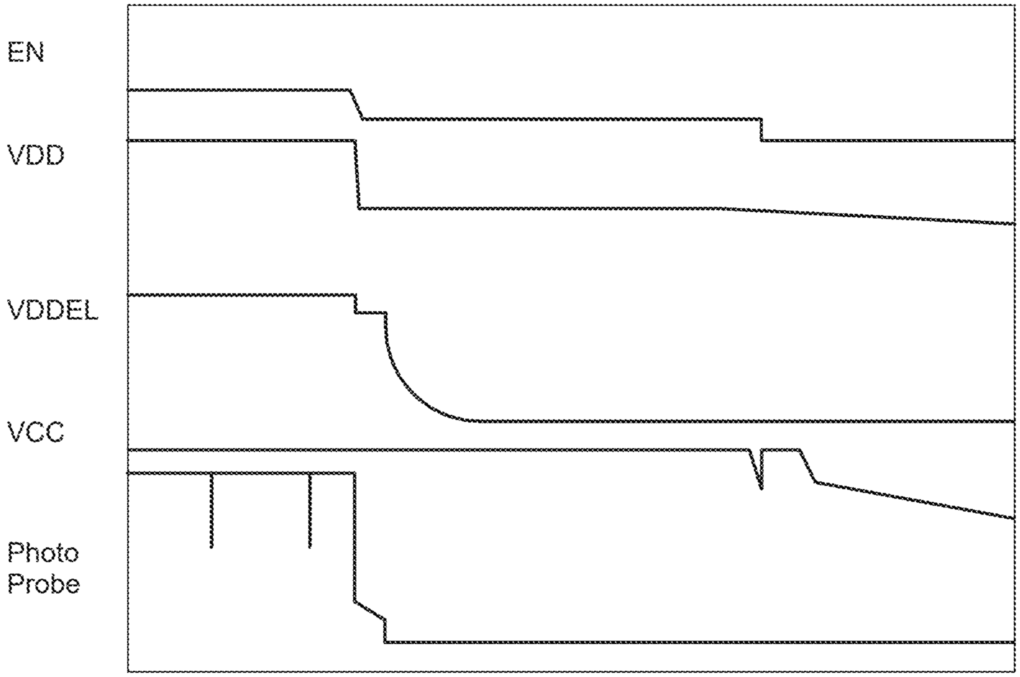

FIG. 6A and FIG. 6B show signal flowcharts for the display device according to an embodiment of the present disclosure. FIG. 6A shows a signal flow of the display device, which does not include a sequence control circuit, according to an embodiment of the present disclosure.

In FIG. 6A and FIG. 6B, EN denotes an enable signal, VDD denotes a high-potential basic voltage, and VDDEL denotes a high-potential power voltage. Also, VCC denotes an operating voltage, and Photo Probe denotes the amount of emission of the display panel.

Referring to FIG. 6A, it can be seen that when the display device is turned off, the VDD drops by a predetermined amount. However, the EN that controls turning-on and/or -off of the power circuit does not drop, but is maintained for a predetermined time or more. Therefore, even when the display device is turned off, the VDDEL may be provided to the display panel and the display panel may emit light.

For example, it can be seen from FIG. 6A that the Photo Probe has certain values changing for irregularly a predetermined time even after the VDD drops. Then, the value of the Photo Probe completely drops. Here, the values of the Photo Probe changing irregularly for the predetermined time may imply that the display panel emits light and flickers, i.e., flickering occurs. Such flickering may be caused by a reversal of a signal flow sequence.

Referring to FIG. 6B, it can be seen that the EN, the VDDEL, and the Photo Probe also drop according to a drop in the VDD. For example, the EN, the VDDEL, and the Photo Probe may drop within a first time period from a drop in the VDD. Herein, the first period may be shorter than a time period in which at least one of the EN, the VDDEL, and the Photo Probe drops in FIG. 6A. The drop in the EN, the VDDEL, and the Photo Probe according to the drop in the VDD may imply that a signal for allowing the display panel to emit light is not provided to the display panel according to turning-off of the display device. Accordingly, it is possible to suppress the occurrence of flickering.

In an the embodiment, sequence control circuit generates the power control signal having a lower value than the second value in a turning-off state to control the power circuit. Therefore, the power circuit can be rapidly turned off according to the turning-off state. Accordingly, it is possible to suppress the supply of an unnecessary VDDEL to the display panel and thus possible to improve the quality of the display device.

The exemplary embodiments of the present disclosure can also be described as follows:

According to an aspect of the present disclosure, the display device includes a display panel in which a pixel circuit including a light-emitting diode and a driving transistor connected to the light-emitting diode is disposed. Also, the display device includes a power circuit configured to generate a high-potential power voltage and supplies the high-potential power voltage to the pixel circuit. Further, the display device includes a sequence control circuit connected to the power circuit, configure to generate a power control signal for controlling whether or not to operate the power circuit and supplies the power control signal to the power circuit.

The power control signal may have a higher voltage value than a first value in a first state and a lower voltage value than a second value in a second state.

The display device may further comprise a display area and a non-display area, and the power circuit and the sequence control circuit are disposed inside the non-display area.

The display device may further comprise a printed circuit board (PCB), the power circuit and the sequence control circuit are disposed on the PCB.

The display device may be provided, from an external system, with a high-potential basic voltage involved in generating the high-potential power voltage and an operating voltage as a power source for operating the power circuit.

The sequence control circuit may be provided with the high-potential basic voltage from the system, adjust a value of the high-potential basic voltage to a value corresponding to the closest natural number equal to or greater than the operating voltage, and uses the adjusted high-potential basic voltage to generate the power control signal.

The sequence control circuit may use a field effect transistor (FET) or a low dropout (LDO) to convert the adjusted high-potential basic voltage into the power control signal.

The sequence control circuit may be provided with the high-potential basic voltage from the system and use a voltage detector to convert the high-potential basic voltage into the power control signal.

The power circuit may be provided with the operating voltage from the system, and the sequence control circuit may be provided with the high-potential basic voltage from the system.

The display device may further comprise a touch circuit, a timing controller, and a main power circuit, and each of the touch circuit, the timing controller, and the main power circuit may be driven based on the operating voltage, and the main power circuit may generate a gate high-potential voltage, a gate low-potential voltage, a reference voltage, and an initial voltage.

The first value may be equal to the second value.

The first value may be different from the second value.

The first state may include a state in which the power circuit is turned on, and the second state may include a state in which the power circuit is turned off.

It will be apparent to those skilled in the art that various modifications and variations can be made in the display device of the present disclosure without departing from the technical idea or scope of the disclosure. Thus, it the present is intended that disclosure cover the modifications and variations of this disclosure provided they come within the scope of the appended claims and their equivalents.

What is claimed is:

1. A display device, comprising:

a display panel in which a pixel circuit including a light-emitting diode and a driving transistor connected to the light-emitting diode is disposed;

a power circuit configured to generate a high-potential power voltage and supply the high-potential power voltage to the pixel circuit; and a sequence control circuit electrically connected to the power circuit, and configured to generate a power control signal for controlling whether or not to operate the power circuit and supply the power control signal to the power circuit, wherein the power circuit is configured to be turned on in a first state and be turned off in a second state according to a voltage value of the power control signal, and wherein the display device is provided, from an external system, with a high-potential basic voltage involved in generating the high-potential power voltage and an operating voltage as a power source for operating the power circuit.

2. The display device according to claim 1, wherein the power control signal has a higher voltage value than a first value in the first state and a lower voltage value than a second value in the second state.

3. The display device according to claim 1, wherein the display device further comprises:

a display area and a non-display area, wherein the power circuit and the sequence control circuit are disposed inside the non-display area.

4. The display device according to claim 1, wherein the display device further comprises:

a printed circuit board (PCB), wherein the power circuit and the sequence control circuit are disposed on the PCB.

5. The display device according to claim 1, wherein the sequence control circuit is provided with the high-potential basic voltage from the system, adjusts a value of the high-potential basic voltage to a value corresponding to the closest natural number equal to or greater than the operating voltage, and uses the adjusted high-potential basic voltage to generate the power control signal.

6. The display device according to claim 5, wherein the sequence control circuit uses a field effect transistor (FET) or a low dropout (LDO) to convert the adjusted high-potential basic voltage into the power control signal.

7. The display device according to claim 1, wherein the sequence control circuit is provided with the high-potential basic voltage from the system and uses a voltage detector to convert the high-potential basic voltage into the power control signal.

8. The display device according to claim 1, wherein the power circuit is provided with the operating voltage from the system, and the sequence control circuit is provided with the high-potential basic voltage from the system.

9. The display device according to claim 8, wherein the display device further comprises:

a touch circuit, a timing controller, and a main power circuit, wherein each of the touch circuit, the timing controller, and the main power circuit is driven based on the operating voltage, and the main power circuit generates a gate high-potential voltage, a gate low-potential voltage, a reference voltage, and an initial voltage.

10. The display device according to claim 2, wherein the first value is equal to the second value.

11. The display device according to claim 2, wherein the first value is different from the second value.

* * * * *